US 7,483,707 B2

(12) United States Patent
Tam et al.

(10) Patent No.: US 7,483,707 B2
(45) Date of Patent: Jan. 27, 2009

(54) VOTING CAMPAIGNS USING UNIVERSAL VOTING CARD

(75) Inventors: Derek Hung Kit Tam, Reston, VA (US); Mark R. Smith, Warrenton, VA (US); Christian Zimmern, Fairfax, VA (US); Robert C. Lovell, Jr., Leesburg, VA (US)

(73) Assignee: Sybase 365, Inc., Reston, VA (US)

( * ) Notice: Subject to any disclaimer, the term of this patent is extended or adjusted under 35 U.S.C. 154(b) by 446 days.

(21) Appl. No.: 10/976,004

(22) Filed: Oct. 29, 2004

(65) Prior Publication Data

US 2005/0197144 A1 Sep. 8, 2005

Related U.S. Application Data

(60) Provisional application No. 60/548,962, filed on Mar. 2, 2004.

(51) Int. Cl.
*H04Q 7/20* (2006.01)
(52) U.S. Cl. ............... 455/466; 455/412.1; 455/558; 725/135; 725/24; 725/13
(58) Field of Classification Search ............ 455/466; 725/135, 24, 13
See application file for complete search history.

(56) References Cited

U.S. PATENT DOCUMENTS

| | | | |
|---|---|---|---|
| 5,351,235 A | 9/1994 | Lahtinen | |
| 5,621,727 A | 4/1997 | Vaudreuil | |
| 5,768,509 A | 6/1998 | Gunluk | |
| 5,887,249 A | 3/1999 | Schmid | |
| 5,894,478 A | 4/1999 | Barzegar et al. | |
| 6,208,870 B1 | 3/2001 | Lorello et al. | |
| 6,230,009 B1 | 5/2001 | Holmes et al. | |
| 6,240,293 B1 | 5/2001 | Koster | |
| 6,327,267 B1 | 12/2001 | Valentine et al. | |
| 6,366,663 B1 | 4/2002 | Bauer et al. | |
| 6,421,437 B1 | 7/2002 | Slutsman | |
| 6,535,746 B1 | 3/2003 | Yu et al. | |
| 6,560,226 B1 | 5/2003 | Torrey et al. | |
| 6,594,254 B1 | 7/2003 | Kelly | |
| 6,658,260 B2 | 12/2003 | Knotts | |
| 6,738,630 B2 | 5/2004 | Ashmore | |
| 6,772,267 B2 | 8/2004 | Thaler et al. | |
| 2002/0015403 A1 | 2/2002 | McConnell et al. | |

(Continued)

FOREIGN PATENT DOCUMENTS

EP 0 777 394 A1 12/1995

(Continued)

*Primary Examiner*—Charles N Appiah
*Assistant Examiner*—Randy Peaches
(74) *Attorney, Agent, or Firm*—Edell, Shapiro & Finnan, LLC

(57) ABSTRACT

A method and system for providing a universal voting card (UVC) is disclosed. Generic votes stored in association with a UVC may be used at any time in any combination against voting campaigns that span, e.g., wireless carrier networks, television networks and television shows. A generic vote is issued by a UVC holder through the dispatch of an SMS message to a destination address (USC, toll-free TN, etc.). Each time that a generic vote is issued by a UVC holder the 'number of votes remaining' on the UVC is decremented; when the 'number of votes remaining' on the UVC reaches zero then the UVC is no longer usable.

13 Claims, 5 Drawing Sheets

U.S. PATENT DOCUMENTS

| | | |
|---|---|---|
| 2002/0029189 A1 | 3/2002 | Titus et al. |
| 2002/0112014 A1 | 8/2002 | Bennett et al. |
| 2002/0167909 A1 | 11/2002 | Balazinski et al. |
| 2003/0083078 A1 | 5/2003 | Allison et al. |
| 2003/0118027 A1 | 6/2003 | Lee et al. |
| 2003/0202521 A1 | 10/2003 | Havinis et al. |
| 2004/0005900 A1* | 1/2004 | Zilliacus ............... 455/466 |
| 2004/0032856 A1 | 2/2004 | Sandstrom |
| 2005/0120389 A1* | 6/2005 | Boss et al. ............... 725/135 |

FOREIGN PATENT DOCUMENTS

| | | |
|---|---|---|
| EP | 0 959 600 A1 | 4/1999 |
| WO | WO 97/36434 | 3/1996 |
| WO | WO 97/20442 | 11/1996 |
| WO | WO 99/11078 | 8/1998 |
| WO | WO 99/33226 | 12/1998 |
| WO | WO 00/41533 | 1/2000 |
| WO | WO 02/25875 A1 | 3/2002 |

* cited by examiner

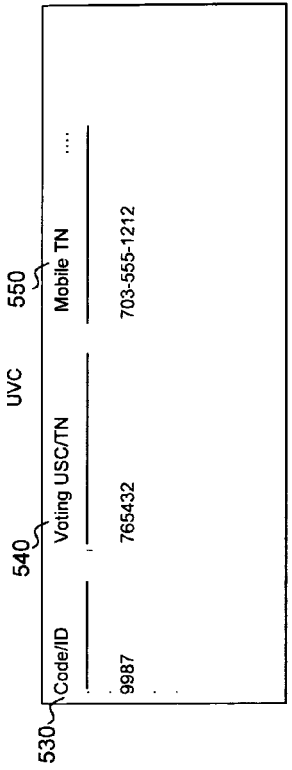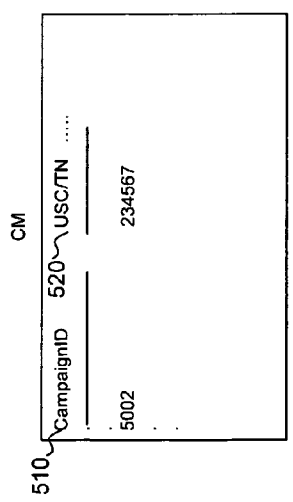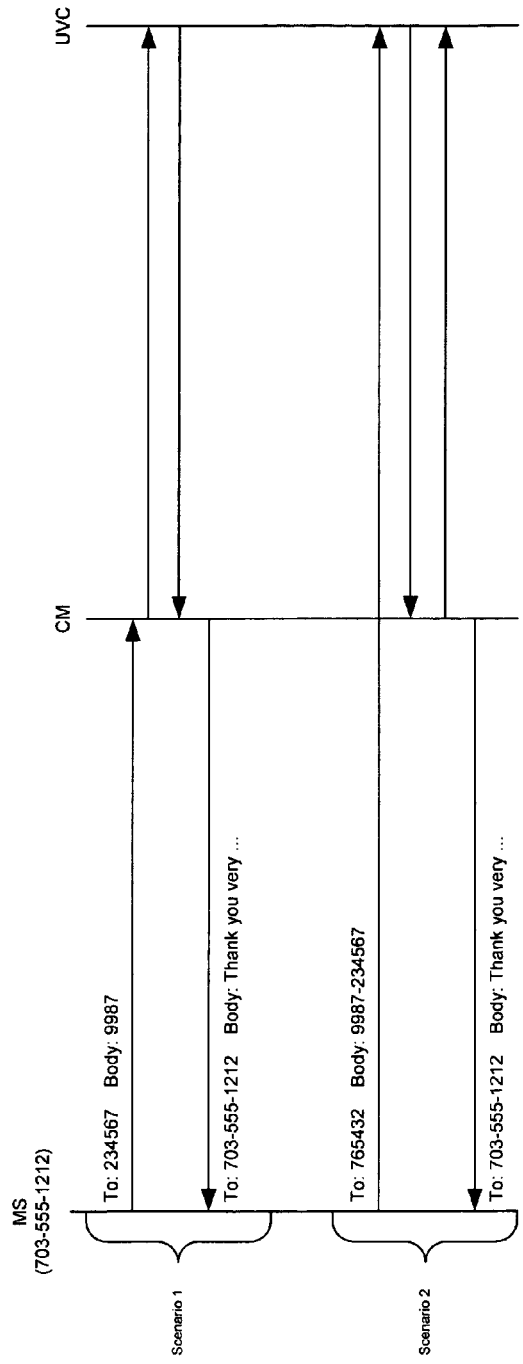
Figure 5A
Figure 5B
Figure 5C

VOTING CAMPAIGNS USING UNIVERSAL VOTING CARD

This application claims the benefit of U.S. Provisional Application No. 60/548,962, filed Mar. 2, 2004, which is herein incorporated by reference in its entirety

BACKGROUND

1. Field of the Invention

The present invention relates generally to providing voting campaigns. More particularly, the present invention relates to providing a universal voting card to enhance voting campaigns utilizing cellular telephony's Short Message Service (SMS).

2. Background of the Invention

SMS is a convenient and easy to use messaging application available to users of mobile telephones and other wireless devices. SMS offers a new way to communicate by sending text or data messages between mobile phones or between a mobile phone and information devices, such as a personal computer (PC), a PDA (personal digital assistant), or a hand-held email/calendar organizer. Messages are composed of words, up to 160 characters in length for Latin alphabets (about 30 to 40 words) and 70 characters for non-Latin alphabets like Arabic and Chinese. To send, text messages are keyed into a mobile phone keypad or other information device. Received text messages are presented on the mobile telephone's screen.

Introduced in Europe and the United Kingdom (U.K.) during the mid-1990s and in Asia soon thereafter, SMS encountered great enthusiasm, especially among teenagers and young adults. And although SMS had originally been conceived as a paging system, users quickly adapted text messaging for their own objectives. By the late 1990s, GSM carriers in both Europe and the U.K. had connected their networks, allowing their subscribers to exchange text messages across other GSM carriers. In 2001, 700 million mobile phone users worldwide sent 20 billion messages every month, making SMS the fastest growing service in the wireless industry.

A portion of messages that are sent via SMS are not sent to another telephone or PDA as in a Person-to-Person communication, but are instead directed to a central location. While the central location could have a regular 10-digit telephone number as does a typical mobile telephone, SMS messages directed to a central location are often so-directed using a so-called short code address. A short code address is a convenient short number that identifies a central location to which an SMS message can be sent. A typical application of short code use is Tele-voting in which, for example, a television program flashes on the screen instructions to "Send an SMS message to 8012 to vote yes." At present, these tele-voting systems are limited to a single wireless carrier (i.e., only those that are subscribers to the wireless carrier that recognizes the short code can participate). Co-pending U.S. patent application Ser. No. 10/742,764, entitled, "Universal Short Code Administration Facility" describes a system that enables short codes to be used across different wireless carriers and thereby make short codes universally available to all subscribers regardless of their wireless service provider.

Co-pending U.S. patent application Ser. No. 10/837,696, entitled, "System and Method for Providing Campaign Management Services," describes a system and method for providing a comprehensive Campaign Manager (CM) Application-Based Service (ABS). The CM ABS provides a flexible, extensible, and feature-rich campaign management platform that supports the provisioning, management, execution, and monitoring of a number of different frameworks, such as, one-way voting and two-way voting, among others, using SMS technology and infrastructure.

For example, one-way voting may involve a mobile subscriber (MS) who notices an advertisement in a newspaper describing a manufacturer's introduction of a new product. The advertisement asks the MS to vote on a favorite product color by sending an SMS message to a particular address (e.g., a Telephone Number (TN) or a short code, such as a universal short code (USC)). The campaign may specify specific codes for each color or differentiate based on free-form text provided by the MS. The MS dispatches an SMS message to the indicated address and optionally receives back a response SMS message that acknowledges the receipt of the vote. Received votes are totaled, with running totals made available for display to authorized administrators, campaign owners, etc., through, e.g. a Web-based interface. Advertisers, manufactures, marketing, and tele-voting could all benefit from such an arrangement, although, CM service is not limited to these entities.

Similarly, two-way voting extends the unidirectional aspect of a one-way voting initiative to include bi-directional 'conversational' communication between the MS and the CM (e.g., MS SMS message→CM, CM SMS message→MS, MS SMS message→CM, etc.). Essentially, additional information can be collected by proceeding through a series of interactive questions and responses until the communication is terminated by either the MS or the campaign.

With the technology briefly described above, numerous voting initiatives (e.g., where invitations to vote are displayed at the bottom of the screen during weekly television programs, where a contest is described on tear-off 'tabs' on soft drink cups at fast-food restaurants, etc.) are possible. Still more initiatives, which leverage the capabilities, features and functions of one-way voting campaigns and two-way voting campaigns, as well as those that complement such voting campaigns are desired.

BRIEF SUMMARY OF THE INVENTION

The method for providing a voting campaign according to the present invention includes a universal voting card (UVC) initiative. The UVC initiative facilitates the participation in voting campaigns. A UVC is a card that is charged or loaded with a specific number of generic votes and that is made available to a mobile subscriber (MS) through various channels (retail, direct mail, etc.). The generic votes on a UVC may be used at any time in any combination against voting campaigns that span wireless carrier networks, span television networks and television shows, etc. A generic vote is issued by a UVC holder through the dispatch of a Short Message Service (SMS) message to a destination address (USC, toll-free TN, etc.). Each time that a generic vote is issued by a UVC holder the 'number of votes remaining' on the UVC is decremented (e.g., in a remote database); and when the 'number of votes remaining' on the UVC reaches zero, then the UVC is no longer usable.

A method of managing a plurality of voting campaigns according to the present invention includes receiving a vote SMS message from a wireless carrier of a card holder of a generic voting card. The vote SMS message has a card identifier identifying the generic voting card, a source address and a vote associated with a first campaign that is issued by the card holder. An identity of the cardholder is validated using the card identifier and the source address. In addition, a number of remaining votes associated with the card is verified as being sufficient for processing the vote. When the identity is validated and the number of remaining votes is sufficient, the vote is processed and the number of remaining votes is reduced.

These and other features of the present invention will be more fully understood upon reading the following detailed description in conjunction with the accompanying drawings.

BRIEF DESCRIPTION OF THE DRAWINGS

FIG. 5A is a schematic diagram illustrating hypothetical contents of campaign manager (CM) platform 250 according to a preferred embodiment of the present invention.

FIG. 5B is a schematic diagram illustrating hypothetical contents of UVC infrastructure 260 according to a preferred embodiment of the present invention.

FIG. 5C illustrates message exchange diagrams of a first and a second voting scenario according to preferred embodiments of the present invention.

DETAILED DESCRIPTION OF THE INVENTION

The method for providing a voting campaign according to the present invention includes a universal voting card (UVC) initiative. The UVC initiative facilitates the more rapid adoption of, and broader participation in, voting campaigns. A UVC is, quite simply, a card (possibly similar in appearance to a credit card or a calling card) that is charged or loaded with a specific number of generic votes and that is made available to MSs through various channels (retail, direct mail, etc.). The generic votes on a UVC may be used at any time in any combination against voting campaigns that span wireless carrier networks, span television networks and television shows, etc. A generic vote is issued by a UVC holder through the dispatch of an SMS message to a destination address (USC, toll-free TN, etc.). Each time that a generic vote is issued by a UVC holder the 'number of votes remaining' on the UVC is decremented; when the 'number of votes remaining' on the UVC reaches zero then the UVC is no longer usable.

Figure 1:
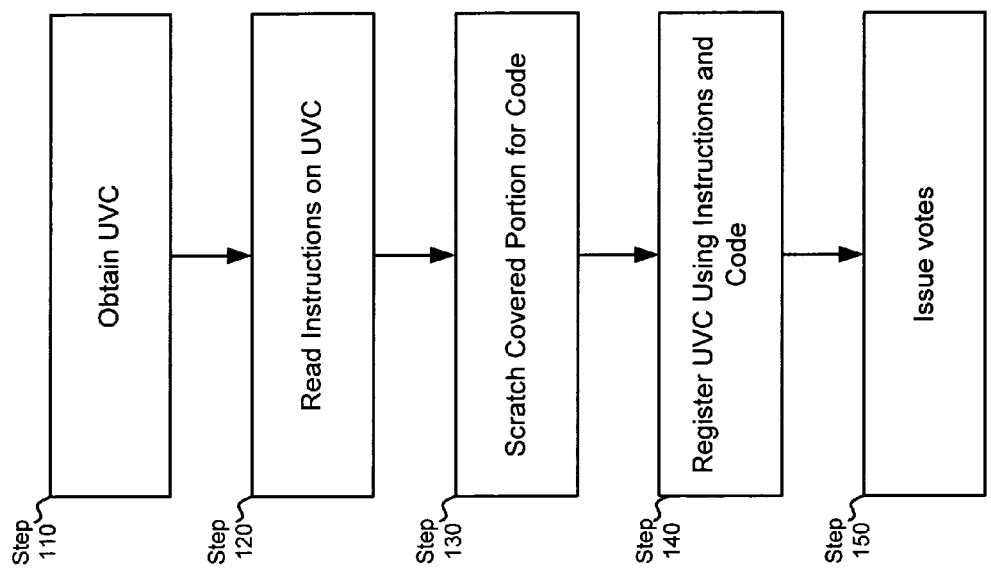
FIG. 1 is a flowchart show use of a universal voting card (UVC) by a holder according to a preferred embodiment of the present invention.

FIG. 1 is a flowchart of a UVC holder using the UVC according to a preferred embodiment of the present invention. In step 110, the UVC holder obtains a UVC. In one embodiment, Jane, a hypothetical MS, purchases a UVC at a local convenience store to become a UVC holder. As part of the purchase process the store clerk may complete some type of UVC activation process. Alternatively, Jane may come into possession of a UVC through various other scenarios. For example, Jane may obtain the UVC through purchase (at a grocery store, at one of her wireless carrier's brick-and-mortar stores, at an electronics or convenience super-store, etc.), as a gift, in a newspaper or magazine (in connection with a print advertising campaign), through the mail (as part of a promotion effort), etc. Various of these scenarios may contain some type of UVC activation process while others (e.g., a direct mail program containing a controlled distribution of a limited number of UVC cards) may not.

In steps 120 and 130, Jane follows the instructions that are printed on the UVC and scratches off a portion of the UVC to reveal an ID or code value. The ID or code value uniquely and authoritatively identifies Jane's, and only Jane's, UVC.

In step 140, again following the instructions that are printed on the UVC, Jane registers her UVC by dispatching an SMS message containing the ID or code value to the destination address. The SMS message is passed from Jane's wireless carrier to an Inter-Carrier Vendor (ICV) for registration of the UVC. After the UVC is registered, Jane may issue a vote in step 150.

Figure 2:
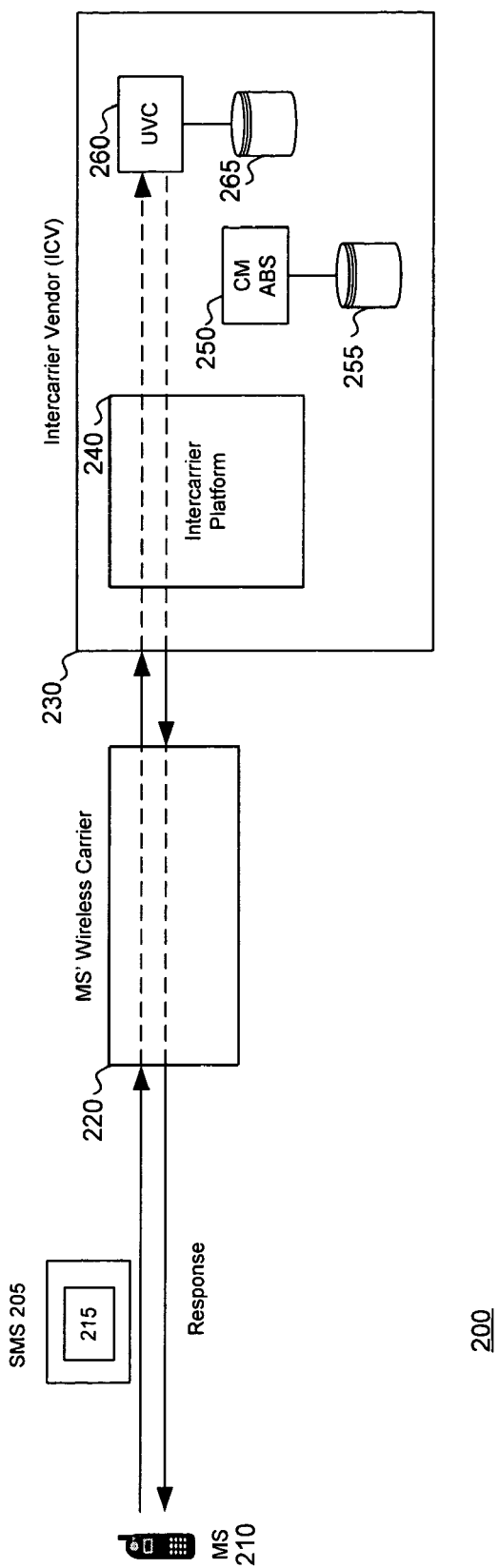
FIG. 2 is a schematic diagram of a registration process according to a preferred embodiment of the present invention.

FIG. 2 is a schematic diagram of a registration process according to a preferred embodiment of the present invention. A system 200 for registering a UVC may include a mobile subscriber (MS) 210, an MS' wireless carrier 220, and an Inter-Carrier Vendor (ICV) 230. ICV 230 preferably includes an intercarrier platform 240, like that described in co-pending application Ser. No. 10/426,662, "Systems and Methods for Interconnecting Heterogeneous Networks," filed May 1, 2003 and incorporated herein by reference, CM ABS platform 250, a CM ABS database 255, UVC infrastructure 260 and UVC database 265.

MS 210, e.g., Jane, registers her UVC by dispatching an SMS message 205 containing the ID or code value 215 printed on the UVC from her mobile device to the destination address (USC, toll-free TN, etc.) that is indicated in the instructions on the UVC. Because Jane's wireless carrier 220 is unable to route or terminate the SMS message (since it is addressed to a destination telephone number that is outside of the carrier's scope), wireless carrier 220 passes SMS message 205 to ICV 230. ICV 230 is an inter-carrier vendor used by Jane's wireless carrier for processing and delivery.

Intercarrier platform 240 of ICV 230 receives SMS message 205 from wireless carrier 220. Intercarrier platform 240 offers comprehensive inter-carrier message processing, routing, and delivery capabilities, as described in co-pending U.S. application Ser. No. 10/426,662. CM ABS platform 250 and UVC infrastructure 260 leverage these processing, routing and delivery capabilities.

Following the receipt of Jane's SMS message 205 from Jane's wireless carrier 220, intercarrier platform 240 examines the destination address (USC, toll-free TN, etc.) found in the SMS message and passes SMS message 205 to UVC infrastructure 260. UVC infrastructure 260, amongst other things, updates its local repository to definitively and authoritatively associate Jane's UVC (through the ID or code value 215 that Jane included in the body of her SMS message 205) with Jane's mobile TN (as extracted from the 'source TN' field of SMS message 205 (not shown)). For example, UVC infrastructure 260 may store Jane's mobile TN together with ID or code value 215 in UVC database 265.

After completing the appropriate UVC system-side processing of Jane's SMS message 205, an SMS response message (that is addressed to Jane's mobile TN) indicating, e.g., "Thank you very much for registering your UVC, you may now begin to vote!" is optionally dispatched to Jane's mobile device. The response SMS message passes from UVC infrastructure 260, to intercarrier platform 240, and to Jane's wireless carrier 220 for delivery to Jane's mobile device.

One can easily envision other UVC registration processes or models, including for example the use of a Web-based interface for the collection of UVC ID or code values. See, for example, co-pending U.S. application Ser. No. 09/593,681, entitled "Method and Apparatus for Providing Integrated Message Delivery to Wireless Devices Over the Internet," filed Jun. 14, 2000, and which is incorporated herein by reference.

Following the successful completion of the UVC registration process there exists within UVC infrastructure 260 a definitive association of Jane's mobile TN to Jane's UVC. Each time that Jane issues a vote from her UVC at least one system-side check is completed to ensure that the vote cast indeed originated from Jane's mobile device. For example, using the UVC ID or code value 215 that was included in SMS message 205, the 'source TN' in SMS message 205 is compared to the TN that previously registered the identified UVC. If the vote originated from any other source, then it is rejected.

It is important to note that Jane may have multiple UVCs 'open' at any one time. Thus, within UVC infrastructure 260 a single mobile TN may be associated with multiple UVCs.

Now that her UVC has been registered, Jane may begin issuing votes according to a first or second voting scenario. In the first scenario, Jane reads about or sees a voting campaign and dispatches a vote (an SMS message) to a destination address (USC, toll-free TN, etc.) that is indicated by the voting campaign. In the second scenario, Jane reads about or sees a voting campaign and dispatches a vote (an SMS message) to the destination address (USC, toll-free TN, etc.) that is identified on her UVC. Note that the destination address that is identified on the UVC may be different from the destination address that was employed during the UVC registration process.

Although two voting scenarios are described herein, it will be obvious to those of ordinary skill in the relevant art that other vote submission scenarios are possible.

Figure 3:
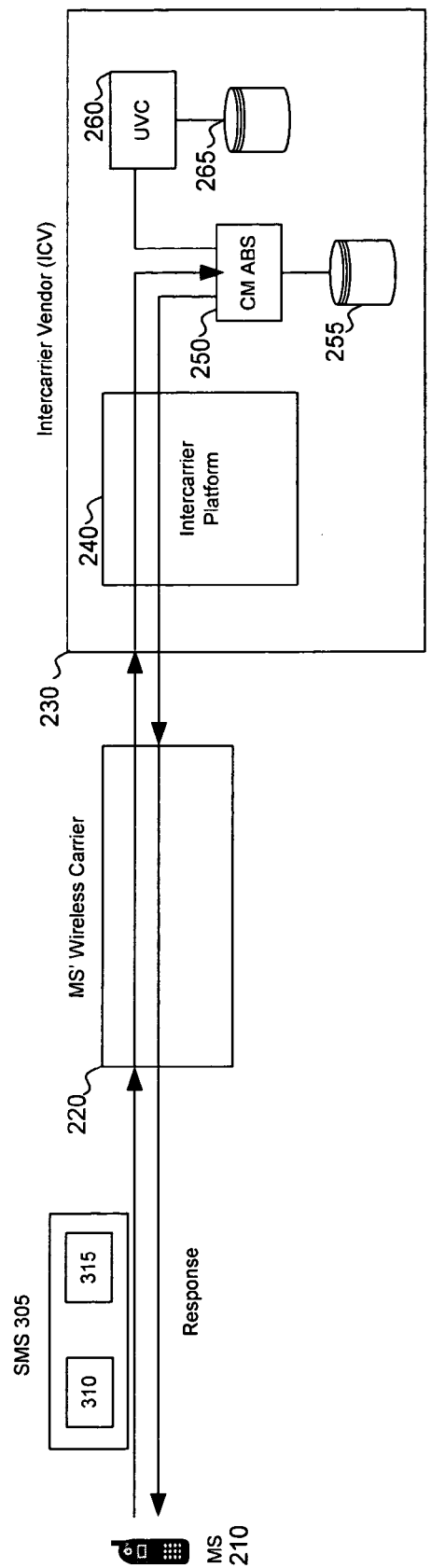
FIG. 3 is a schematic diagram of a first voting scenario according to a preferred embodiment of the present invention.

FIG. 3 is a schematic diagram of a first voting scenario according to a preferred embodiment of the present invention. Under the first scenario, Jane dispatches an SMS message 305 containing her UVC ID or code value 310, and optionally any campaign-specific information 315 that was requested by the campaign description that Jane saw or read. Jane dispatches SMS message 305 to the destination address (USC, toll-free TN, etc.) that was indicated by the voting campaign. Since Jane's wireless carrier 220 is unable to route or terminate SMS message 305 (since it is addressed to a destination TN that is outside of the carrier's scope) wireless carrier 220 passes SMS message 305 to ICV 230 for processing and delivery.

Intercarrier platform 240 of ICV 230 first receives SMS message 305. The comprehensive message routing and delivery subsystems of intercarrier platform 240 examines the destination address (USC, toll-free TN, etc.) found in SMS message 305 and passes SMS message 305 to CM ABS platform 250.

CM ABS platform 250 leverages UVC infrastructure 260 to, amongst other things, validate the source of SMS message 305. Particularly, CBS ABS platform 250 forwards the message to UVC infrastructure 260. UVC infrastructure 260 extracts UVC ID or code value 310 from SMS message 305. Then, UVC infrastructure 260 locates a TN stored in UVC database 265 during registration of the identified UVC and verifies that it matches the 'source TN' (not shown) in SMS message 305. Only votes from a TN that previously registered the UVC (e.g., votes where the source TN match the stored TN in UVC database 265) are processed. In addition, UVC infrastructure 260 verifies that the indicated UVC's 'number of votes remaining' counter is greater than zero. Votes issued by a UVC holder having a UVC's 'number of votes remaining' counter greater than zero are processed. When the 'number of votes remaining' counter is less than one, the vote is not processed.

If needed, a real-time Number Portability (NP) lookup operation against Jane's mobile TN may be completed to authoritatively identify wireless carrier 220 that services the mobile TN. Next, the appropriate system-side processing of Jane's SMS message is completed (including, for example, all of the required processing by the CM ABS of Jane's vote). Then, the 'number of votes remaining' counter on Jane's UVC would be decremented by one, and optionally an SMS response message (that is addressed to Jane's mobile TN) indicating "Thank you very much for your vote!" may be dispatched to Jane's mobile device. The response SMS message would pass from CM ABS platform 250, to intercarrier platform 240, and to Jane's wireless carrier 220 for delivery to Jane's mobile device.

Figure 4:
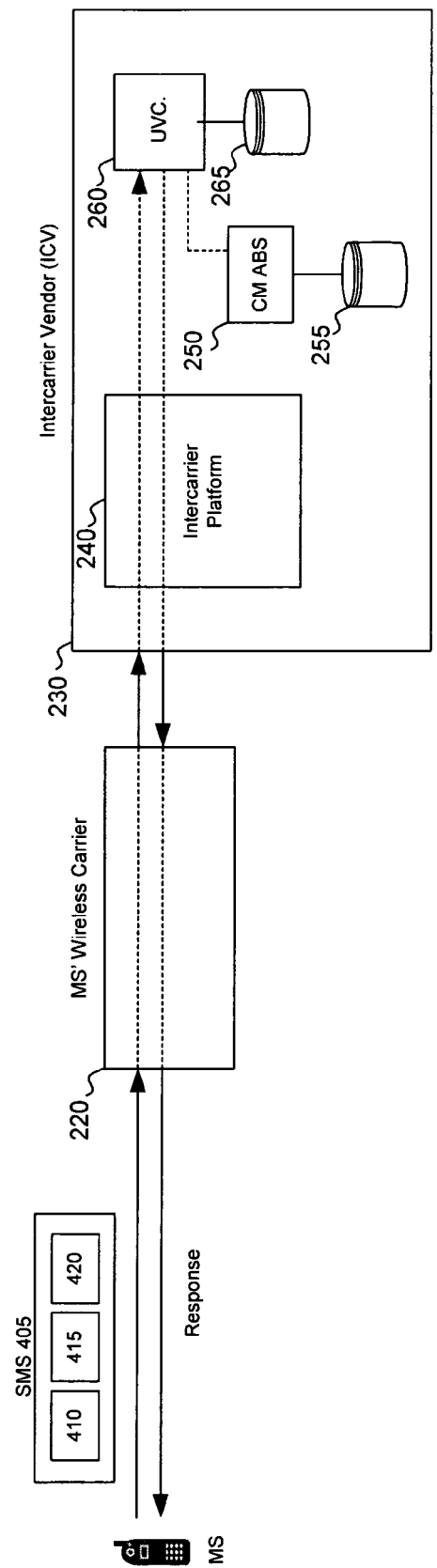
FIG. 4 is a schematic diagram of a second voting scenario according to a preferred embodiment of the present invention.

FIG. 4 is a schematic diagram of a second voting scenario according to a preferred embodiment of the present invention. Under the second voting scenario, Jane dispatches an SMS message 405 containing her UVC ID or code value 410, the destination address (USC, toll-free TN, etc.) 415 that was indicated by the voting campaign, and optionally any campaign-specific information 420 that was requested by the campaign description that Jane saw or read. Jane dispatches SMS message 405 to the destination address that is identified on her UVC. Since Jane's wireless carrier 220 will be unable to route or terminate SMS message 405 (since it is addressed to a destination TN that is outside of the carrier's scope), wireless carrier 220 will pass SMS message 405 to its ICV 230 for processing and delivery.

Intercarrier platform 240 of ICV 230 first receives SMS message 405. The comprehensive message routing and delivery subsystems of intercarrier platform 240 examines the destination address (USC, toll-free TN, etc.) found in SMS message 405 and passes SMS message 405 to UVC infrastructure 260.

UPC infrastructure 260, amongst other things, validates the source of SMS message 405 (i.e., using the UVC ID or code value 410 that was included in the SMS message that was received from Jane's wireless carrier 220, the 'source TN' in SMS message 220 will be compared to the TN that previously registered the identified UVC), verifies that the indicated UVC's 'number of votes remaining' counter is greater than zero, etc.

If needed, a real-time NP lookup operation against Jane's mobile TN may be completed to authoritatively identify the wireless carrier that services the mobile TN. Next, the appropriate system-side processing of Jane's SMS message 405 is completed (including, for example, all of the required processing by the CM ABS of Jane's vote). Then the 'number of votes remaining' counter on Jane's UVC is decremented by one, and optionally an SMS response message (that is addressed to Jane's mobile TN) indicating "Thank you very much for your vote!" may be dispatched to Jane's mobile device. The response SMS message would pass from UVC infrastructure 260, to the intercarrier platform 240, and to Jane's wireless carrier 220 for delivery to Jane's mobile device.

FIGS. 5A, 5B and 5C illustrate various aspects of exchanges that occur during the two voting scenarios described in FIGS. 3 and 4. FIG. 5A is a schematic diagram illustrating hypothetical contents of CM platform 250 according to a preferred embodiment of the present invention. CM platform 250 contains CampaignID 510 and USC/TN 520. CampaignID 510 is an internal ID that represents a provisioned campaign. The CM platform may contain a number of provisioned campaigns. USC/TN 520 is a destination address, such as a USC or TN, associated with a particular campaign. Here, CampaignID 510 includes a voting campaign that has been assigned the internal ID 5002 and to which the USC 234567 has been associated.

FIG. 5B is a schematic diagram illustrating hypothetical contents of UVC infrastructure 260 according to a preferred embodiment of the present invention. The UVC infrastructure 260 may include various records. A record may include a field for Code/ID 530, Voting USC/TN 540, and Mobile TN 550. Code/ID 530 is a code value or ID uniquely and authoritatively identifying a particular UVC. Voting USC/TN 540 is a destination USC or TN for receiving SMS messages associated with the UVC identified by Code/ID 530. Mobile TN 550 is a registered mobile TN of a UVC holder definitively associated with the holder's UVC Code/ID 530.

In FIG. 5B, UVC infrastructure 560 contains a record indicating that Jane has registered a UVC having Code/ID 530 of 9987 using Mobile TN 550 of 703-555-1212. To submit a vote Jane should dispatch an SMS message from her Mobile TN 550 (i.e., 703-555-1212) to Voting USC/TN 540 (i.e., 765432). The SMS message should contain: (1) Code/ID 530 (i.e., 9987) and (2) the destination address (USC, toll-free TN, etc.) that was indicated by the voting campaign. For example, the voting campaign may indicate that Jane should use the address identified on her UVC (Voting Scenario 2) or it may indicate its own destination address (Voting Scenario 1).

FIG. 5C illustrates message exchange diagrams of a first and a second voting scenario according to preferred embodiments of the present invention. As described previously, the first voting scenario occurs when Jane sees or reads about a voting campaign and dispatches a vote (an SMS message) to a destination address (USC, toll-free TN, etc.) that is indicated by the voting campaign. For example, referring to FIG. 5A, for CampaignID 510 5002 Jane dispatches an SMS message to USC/TN 520 234567, which is the destination address indicated by voting campaign 5002. In the message Jane includes Code/ID 530 9987, which represents her unique UVC.

The message is forwarded from Jane's wireless carrier to CM ABS platform 250. As described in reference to FIG. 3, CM ABS platform forwards the SMS message to UVC infrastructure 260 for UVC processing. For example, UVC infrastructure 260 validates the source of Jane's SMS message and verifies that the UVC has sufficient votes remaining to process the current vote. After decreasing the 'number of votes remaining' counter on Jane's UVC, UVC infrastructure 260 optionally may send an SMS response message (that is addressed to Jane's mobile TN) indicating "Thank you very much for your vote!" to Jane's mobile device (e.g., 703-555-1212). The response SMS message would pass through CM ABS platform 250 before delivery to Jane's mobile device.

In contrast, in the second voting scenario, Jane sees or reads about a voting campaign and dispatches a vote (an SMS message) to the destination address (USC, toll-free TN, etc.) that is identified on her UVC. For example, to make a vote for CampaignID 510 5002, Jane would send an SMS message to a generic address identified on her UVC, which is 765432. Because the UVC infrastructure receives SMS messages relating to various campaigns, the SMS message provided to the UVC infrastructure needs additional identification to forward the information to the appropriate campaign. Thus, the SMS message sent by Jane includes Code/ID 530 9987 and USC/TN 520 234567 of the campaign.

UVC infrastructure 260 processes the UVC information and optionally forwards a response message "Thank you very much for your vote!" to Jane's mobile device. The response message is first received by CM ABS platform 250. CM ABS platform 250 processes Jane's vote and indicates to the UVC infrastructure when processing is complete (the processing being similar to that described previously). Finally, CM ABS platform 250 forwards the response message to Jane's mobile device 703-555-1212 when processing of the vote is complete.

The two scenarios presented herein are exemplary only and are by no means intended to be exhaustive. It will be obvious to one or ordinary skill in the relevant art that other arrangements are easily possible.

Regardless of the manner through which a vote arrives at the CM ABS environment, within that environment vote processing, tracking, reporting, etc. activities are preferably completed. These activities may optionally also include an incremental revenue disbursement scheme. For example, a portion of the proceeds from the original sale of a UVC may be allocated to a 'bucket' or 'account' and then (until the bucket/account is empty) parceled out, to wireless carriers and possibly others, on a defined and configurable basis as individual votes are received from a UVC. Other revenue disbursement models are also possible and would depend on the nature of the parties involved.

Based on the hypothetical example that was described above, one can imagine that the UVC infrastructure would contain one or more repositories (e.g., realized possibly as conventional, in-memory, etc. database environments) within which would be stored a range of data elements, including:

| Repository | Data Elements |
|---|---|
| UVC | Id (the identifier or code value that is unique to a UVC) |
| | The date and time that the UVC was created |
| | The destination address (USC, toll-free TN, etc.) to be used for UVC registration |
| | The destination address (USC, toll-free TN, etc.) to be used for submitting a vote |
| | The date and time that the UVC will expire |
| | The number of votes that the UVC was originally 'charged' with |
| | The number of votes remaining on the UVC |
| | Optionally the date and time that the UVC was activated by a store clerk, etc. |
| | The date and time that the UVC was registered by a MS |
| | The MDN of the MS that registered the UVC |
| MS | The MDN (the MS' mobile telephone number) |
| | The date and time that this MS was first identified or encountered |
| Audit Trail | The particulars (date, time, action, etc.) of various activities (registration, usage, etc.) within the UVC infrastructure |

It is noted that this catalog of data elements is exemplary only. It will be appreciated by one of ordinary skill in the relevant art that it would be easily possible to include other individual data elements and/or employ alternate arrangements or groupings of individual data elements.

While the instant description focuses on SMS messaging, it will be clear to one of ordinary skill in the relevant art that other messaging mediums—e.g., Multimedia Message Service (MMS)—may also be easily employed.

It is also important to note that the narrative that was presented above included a linkage between the CM ABS platform and the UVC infrastructure. It will be clear to one of ordinary skill in the relevant art that other, alternative, arrangements are certainly possible.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of managing a plurality of voting campaigns, comprising:
   receiving a vote Short Message Service (SMS) message from a wireless carrier of a card holder of a generic voting card, the vote SMS message having a card identifier identifying the generic voting card, a source address and a vote associated with a first campaign, the vote SMS message being issued by the card holder via a mobile device belonging to the card holder;
   validating an identity of the cardholder using the card identifier and the source address;
   verifying that a number of remaining votes associated with the card is sufficient for processing the vote;
   processing the vote when the identity is validated and the number of remaining votes is sufficient; and
   reducing the number of remaining votes,
   wherein the vote SMS message is received at a first destination address which is listed on the generic voting card, and wherein the vote SMS message contains a second destination address associated with the first campaign, and
   wherein each of the first destination address, the second destination address, and the card identifier is provided by the card holder in the vote SMS message that is dispatched by the card holder.

2. The method of claim 1, further comprising: issuing a response SMS message to the source address indicating that the vote is processed.

3. The method of claim 1, wherein voting campaign information extracted from the vote SMS message is processed by a campaign manager platform and generic voting card information extracted from the vote SMS message is processed by a voting card platform.

4. The method of claim 1, wherein the vote SMS message is validated by comparing the source address to a stored address that was stored during registration of the generic voting card by the card holder.

5. The method of claim 1, wherein the number of remaining votes is sufficient when it is greater than zero and wherein the number of remaining votes is reduced by one for each vote processed.

6. A system of managing a plurality of voting campaigns, comprising:
   a receiver for receiving a vote Short Message Service (SMS) message from a wireless carrier of a card holder of a generic voting card, the vote SMS message having a card identifier identifying the generic voting card, a source address and a vote associated with a first campaign, the vote SMS message being issued by the card holder via a mobile device belonging to the card holder;
   a voting card platform for validating an identity of the cardholder using the card identifier and the source address, verifying that a number of remaining votes associated with the card is sufficient for processing the vote; and
   a campaign manager platform for processing the vote when the identity is validated and the number of remaining votes is sufficient,
   wherein the vote SMS message is received at a first destination address which is listed on the generic voting card, and wherein the vote SMS message contains a second destination address associated with the first campaign which is used by the campaign manager platform for processing the vote, and
   wherein each of the first destination address, the second destination address, and the card identifier is provided by the card holder in the vote SMS message that is dispatched by the card holder, wherein the number of remaining votes is sufficient when the number of remaining votes is greater than zero and wherein the number of remaining votes is reduced by one for each vote processed.

7. The system of claim 6, wherein the vote SMS message is received at the voting card platform for validating the identity and verifying that the number of remaining votes is sufficient, is passed from the voting card platform to the campaign manager platform for processing the vote, and is passed from the campaign management platform to the voting card platform for managing the number of remaining votes.

8. The system of claim 6, wherein the vote SMS message is received at a destination address associated with the first campaign.

9. The system of claim 8, wherein the vote SMS message is received at the campaign manager platform and the campaign manager passes the vote SMS message to the voting card platform for processing.

10. The system of claim 6, further comprising: issuing a response SMS message to the source address indicating that the vote is processed.

11. The system of claim 6, wherein the voting card platform validates the vote SMS message by comparing the source address to a stored address that was stored during registration of the generic voting card by the card holder.

12. A system of managing a plurality of voting campaigns, comprising:
   means for receiving a vote Short Message Service (SMS) message from a wireless carrier of a card holder of a generic voting card, the SMS message having a card identifier identifying the generic voting card, a source address and a vote associated with a first campaign, the vote SMS message being issued by the card holder via a mobile device belonging to the card holder;
   means for validating an identity of the cardholder using the card identifier and the source address;
   means for verifying that a number of remaining votes associated with the card is sufficient for processing the vote;
   means for processing the vote when the identity is validated and the number of remaining votes is sufficient; and
   means for reducing the number of remaining votes,
   wherein the vote SMS message is received at a first destination address which is listed on the generic voting card, and wherein the vote SMS message contains a second destination address associated with the first campaign, and
   wherein each of the first destination address, the second destination address, and the card identifier is provided by the card holder in the vote SMS message that is dispatched by the card holder.

13. The system of claim 12, wherein the vote SMS message is validated by comparing the source address to a stored address that was stored during registration of the generic voting card by the card holder.

* * * * *

UNITED STATES PATENT AND TRADEMARK OFFICE
CERTIFICATE OF CORRECTION

PATENT NO. : 7,483,707 B2  Page 1 of 1
APPLICATION NO. : 10/976004
DATED : January 27, 2009
INVENTOR(S) : Derek Hung Kit Tam et al.

It is certified that error appears in the above-identified patent and that said Letters Patent is hereby corrected as shown below:

1) Column 3, Line 11, "flowchart show use" should be --flowchart showing use--

2) Column 6, Line 30, "UPC infrastructure" should be --UVC infrastructure--

Signed and Sealed this

Ninth Day of June, 2009

JOHN DOLL
*Acting Director of the United States Patent and Trademark Office*